(No Model.)

A. E. SPANGLER.
VEHICLE TIRE.

No. 505,929.  Patented Oct. 3, 1893.

WITNESSES:
H. A. Carhart.
C. W. Marvin.

INVENTOR
Albert E. Spangler,
BY
Smith & Denison
ATTORNEYS.

UNITED STATES PATENT OFFICE.

ALBERT E. SPANGLER, OF SYRACUSE, NEW YORK.

VEHICLE-TIRE.

SPECIFICATION forming part of Letters Patent No. 505,929, dated October 3, 1893.

Application filed July 28, 1893. Serial No. 481,707. (No model.)

*To all whom it may concern:*

Be it known that I, ALBERT E. SPANGLER, of Syracuse, in the county of Onondaga, in the State of New York, have invented new and useful Improvements in Vehicle-Tires, of which the following, taken in connection with the accompanying drawings, is a full, clear, and exact description.

This invention relates to detachable bicycle tires.

When pneumatic tires for bicycles were first constructed and extensively put upon the market, it was supposed that it was necessary to construct the outer rim of the wheel concave and cement the tire thereon, no means at that time having been produced for securing the shoe detachably thereto, the result being that at the present time there is a large number of bicycles which are practically inoperative for the reason that the tires have become punctured or worn out, and there is no way of replacing said tire upon such a a rim, except by returning the same to the factory at a large expense; and for the purpose of utilizing these old wheels in their present form, my object is to produce a fastening device adapted to detachably secure upon each of such wheels, a shoe, so that each owner of such wheels can order a pneumatic tire and place it upon the wheel without further expense than the cost of the tire; and to that end my invention consists in the several new and novel combinations of parts hereinafter described and specifically set forth in the claims hereunto annexed. It is constructed as follows, reference being had to the accompanying drawings, in which—

Figure 1:
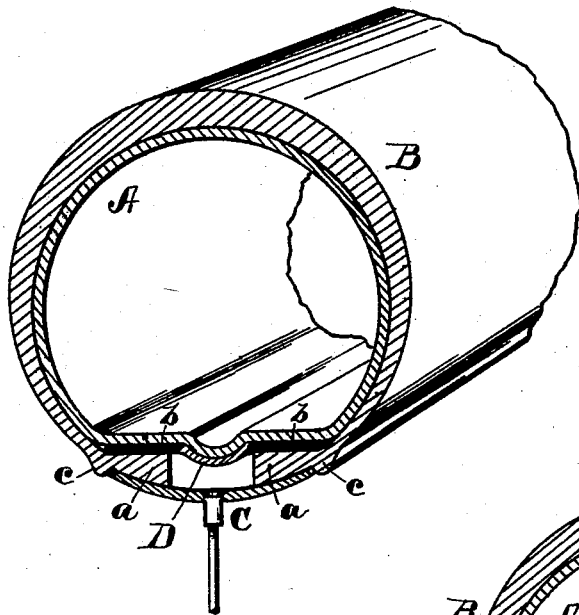
Figure 2:
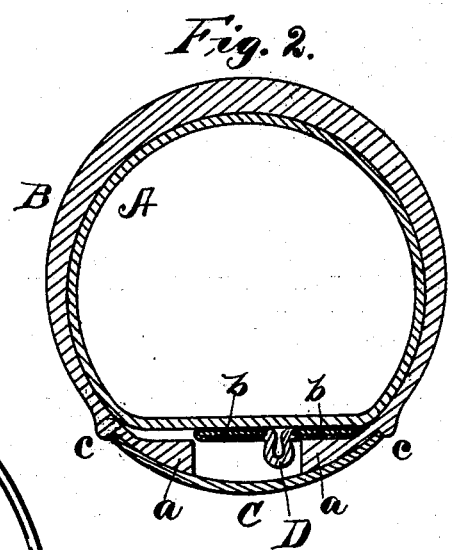
Figure 3:
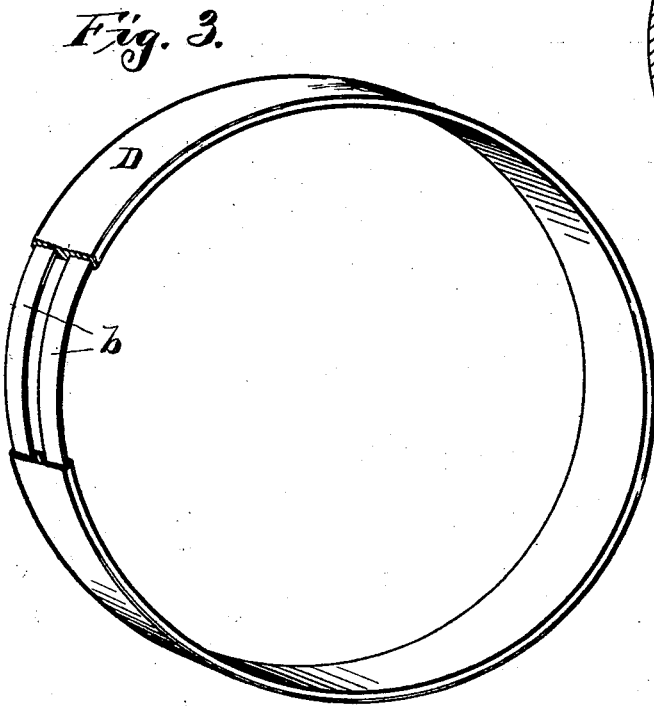

Figure 1. is a cross section of the tire complete, inflated. Fig. 2. is a cross section showing one of the continuous bands forced out of its normal position for the purpose of withdrawing or inserting one of the lateral edges of the shoe. Fig. 3. is a view of the continuous bands, showing a resilient connection between them.

A, is an ordinary pneumatic sack.

B, is the shoe or casing inclosing said sack and having its lateral edges —$a$— thickened so as to present substantially plane faces interiorly to said shoe, or in a line which is a chord of the circle of the shoe, or of the circle of the concavity of the rim; and also concentric with the center of the wheel of which the rim is a part. This shoe is also provided with exterior beadings —$c$— at such distances from the edges as to engage with the edges of the rim of the wheel and serving to regulate and control the position of the shoe upon and the entrance of the edges into, the rim, and also to prevent displacement of the shoe by twisting upon said rim by torsional strain upon the shoe.

C, is the rim of the wheel concaved substantially as shown, creating the common form of tire, to which either solid, cushioned, or tubular tires have been heretofore cemented.

D, is a strip of leather, rubber, rubber webbing or canvas, or canvas and rubber, or any other suitably flexible elastic or resilient material, to which the flat bands —$b$— are laterally secured, or mounted in any ordinary manner, said bands being concentric with the center of the wheel, and parallel to the chord of the circle of the rim, and fitting upon the inner faces of the edges of the shoe, and under pressure, bearing upon or against the edges of the shoe in a direction radial to the circle of the wheel; said bands being also adapted to be forced apart or expanded laterally, and in the planes of their faces and to traverse the edges of the shoe outwardly, when the sack is inflated, and to return or retract or be contracted or retracted when the sack is deflated. When the sack is inflated, each band securely locks the thickened edge of the shoe with which it engages, onto the rim, and the beads —$c$— form convenient seats between the shoe and the other edges of the rim, and also operate as cushions to receive the weight of the load upon the wheel, adding to the resiliency of the shoe, and serving also to protect the shoe from the wear of the edges of the rim thereon, incident to the action of the shoe under its load.

It will be observed that when it is necessary or desirable to remove the shoe, the pneumatic sack may be deflated and the bands forced inwardly until a sufficient opening is produced between the lateral edge of the plate and the lateral edges of the rim to allow of its withdrawal.

It will be seen that this invention has no reference to that class of vehicle tires in which the rims are provided with edge concavities or pockets to receive the edges of the shoe, but applies only to concave or dishing rims; nor does it apply to inventions in which the edges of the shoe are locked into the edges of the rim by a solid or longitudinally sectional locking band, provided upon its edges with flanges which engage with or partially inclose the edges of the shoe.

What I claim is—

1. The combination with the concave rim of a wheel, of a pneumatic sack, a shoe having enlarged lateral edges inclosing the same, and continuous flat bands having a resilient connection adapted to be contracted or expanded laterally in the planes of their faces.

2. The combination with the concave rim of a wheel, of a pneumatic sack, a shoe having enlarged lateral edges, and an external longitudinal beading, inclosing the said sack, and continuous bands having a resilient connection adapted to be expanded or contracted in the planes of their faces.

3. The combination with a concave rim of a wheel, of a pneumatic sack, a shoe inclosing it, having thickened edges, and continuous flat bands laterally connected bearing upon the edges of the shoe in a direction radial to the wheel, and adapted to be forced apart laterally in the planes of their faces when the sack is inflated.

4. In a wheel, the combination with a concave rim, a pneumatic sack and a shoe inclosing it and having thickened edges lying in said rim concavity, of a lock comprising flat bands resiliently connected and expansible laterally in the plane of their faces when the sack is inflated, engaging with the edges of the shoe.

In witness whereof I have hereunto set my hand on this 26th day of July, 1893.

ALBERT E. SPANGLER.

In presence of—
EVA KOPELOWICH,
HOWARD P. DENISON.